TELEPHONE HOLD PROGRAM SYSTEM

Filed March 26, 1962

INVENTOR.
ALFRED LEVY

BY

[signature]

ATTORNEYS

United States Patent Office 3,246,082
Patented Apr. 12, 1966

3,246,082
TELEPHONE HOLD PROGRAM SYSTEM

Alfred Levy, 5 Manning Road, Glen Cove, N.Y.

Filed Mar. 26, 1962, Ser. No. 182,208
20 Claims. (Cl. 179—1)

This invention relates to a telephone hold program system.

In the course of receiving telephone calls, subscribers who have more than one local extension or more than one incoming trunk line, or both, frequently find it necessary to shunt (i.e. put to one side or hold in abeyance), a call received on an incoming trunk until a desired party is called to the telephone or transfers from one to another local extension, or until the desired party completes a previous call on another incoming trunk and his local line becomes clear to receive the shunted call. The shunting of such a call is more commonly known as "holding" of a call. For this purpose telephone hand sets, i.e. telephone instruments, and local switchboards, are provided with an instrumentality known as a "hold" key or a "hold" button. By manipulating this instrumentality a subscriber or switchboard operator is able to transfer an incoming call to a holding circuit instead of to a local telephone instrument. The holding circuit has characteristics which are such as to maintain the connection of the held call at the central office switchboard, i.e. the central exchange. This holding circuit essentially is a shunting circuit which simulates the electrical characteristics of the subscriber's local telephone handset circuit. Subsequently when the held incoming line is connected to a local telephone instrument the incoming call will be automatically disconnected from the holding circuit and will be transferred to a desired local extension by operation of a "pick-up" or "talk" key so that the call may be completed in a normal fashion.

During the time that an incoming call is being held in the above described fashion the originator of the call (the incoming caller) hears no sound in the ear piece of his telephone instrument. Insofar as he is concerned he is connected to a dead line. This is often disturbing or exasperating because a busy concern sometimes, and not infrequently, will defer, i.e. hold, incoming calls for considerable lengths of time, so long, indeed, that the originator of the call often is lead to believe that his connection has been broken or that his call has been forgotten or that something has gone wrong with the telephone equipment. His exasperation many times is heightened by a switchboard operator who, if harassed by a great number of incoming calls, gives short shrift to any particular caller before transferring the caller to a holding circuit. Such a busy operator frequently will simply acknowledge the call and then immediately say that the desired party or the desired line is busy and that the caller should "hold for a moment." Thereupon, before the incoming caller has had a chance to reply or comment, he will find himself on a held line. Courteous telephone practice requires that a held caller be assured at reasonable intervals that the party to whom he wishes to speak still is busy but the pressure of her duties may prevent the operator from so advising the incoming caller so that he may be bereft of even this small consolation. In any event, listening to a completely unresponsive instrument is tedious and calls often are abandoned altogether or remade which leads to annoyance and a waste of time and money.

The foregoing conditions are particularly prevalent in the case of firms which handle a great volume of calls such, for instance, as department stores, large manufacturers, transportation concerns, entertainment agencies and the like; but such conditions also are irksome even for small businesses or professional people who have only a few trunk lines and a few local extensions.

It is an object of the present invention to provide a telephone hold program system which avoids the foregoing drawbacks.

More particularly it is an object of the present invention to provide a system of the character described which upon actuation of a hold instrumentality, e.g. a key or button, will connect the incoming call to a source of program material, e.g. music, thereby to pacify the originator of the call if the delay becomes unduly long, and also to while away the idle time of the caller who is awaiting connection to a certain party or extension.

It is another object of my present invention to provide a system of the character described which by connecting an incoming held call to a source of program material advises and assures the incoming caller that his call is being held and that he is not disconnected or forgotten.

Other objects of my invention in part will be obvious and in part will be pointed out hereinafter.

My invention accordingly consists in the features of construction, combinations of elements and arrangements of parts which will be exemplified in the systems hereinafter described and of which the scope of application will be indicated in the appended claims.

In the accompanying drawings, in which I have shown various posible embodiments of my invention, FIG. 1 shows a standard telephone holding circuit modified in accordance with my invention to provide a hold program system;

Figures 1, 2, 3, 4, 5:
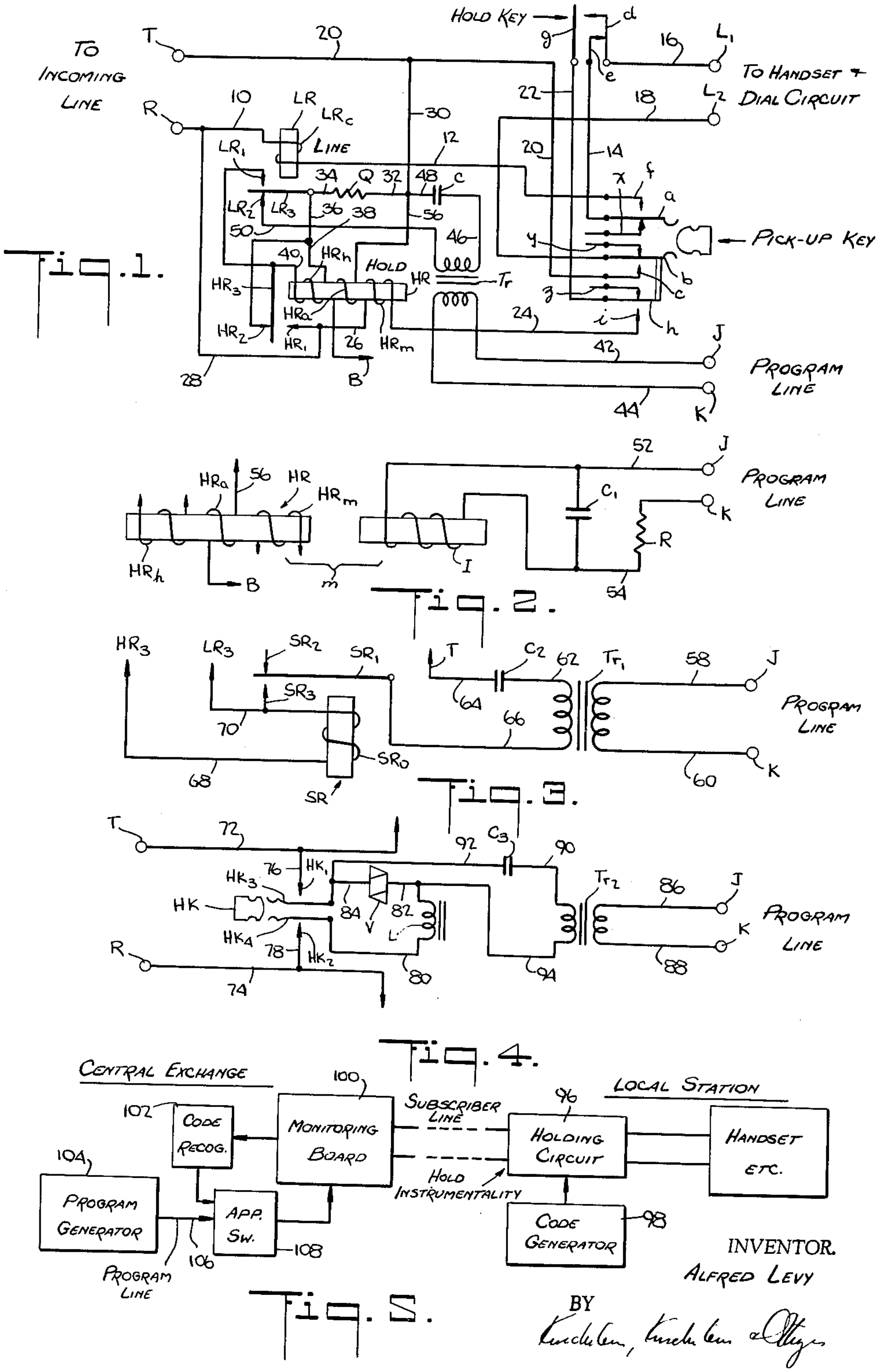
FIG. 2 shows another modification of said standard holding circuit which will effect my invention.
FIG. 3 shows a further modification of said standard holding circuit which will effect my invention.
FIG. 4 shows a different standard telephone holding circuit modified in accordance with another embodiment of my invention to provide a hold program system.
FIG. 5 shows a telephone circuit employing a further modified form of my invention.

In general I carry out my invention by providing a source of program material (a program line) and by connecting this source of program material to an incoming call (line) upon actuation of the holding instrumentality. Any suitable source of program material may be used such for example as a phonograph, a wire recorder, a tape recorder, a magnetic drum recorder, a live program, a broadcast, i.e. radio program, or a commercial program line such as is employed to supply music to establishments, e.g. restaurants and stores. The source of program material may be coupled to the incoming line at the subscriber's instrument or at the subscriber's local exchange or at the telephone central exchange and said source can be physically located either on the subscriber's premises or at the premises of the central exchange or at the premises of the concern supplying the hold program system service. Suitable components and circuitry are utilized to effect the aforesaid results. Generically stated, the program line is connected incoming line through a switch which is normally open and which is closed upon operation of the hold instrumentality. The term "switch" is used herein in its broadest sense so that the switch may be electromechanical, as for example a relay, or purely mechanical, as for example contacts actuated by the hold instrumentality, or the switch may be electronic, as for example a vacuum tube connected to act as a gate or a solid state device, as for example a transistor or silicon control rectifier, connected to act as a gate.

The coupling (connection) of the program line to the held (incoming) line may be a direct metallic connection either by insertion (series connection) in the holding circuit or across (in parallel with) a component of the holding circuit or it may take place by capacitive (electrostatic) or inductive (electromagnetic) coupling which avoids the necessity of making a direct metallic contact. Thus the program line may be connected through a switch to the held line by internal connections to the telephone circuits so that only the particular incoming line which is being held is effected or the program line may be connected to the held incoming line at the central exchange through a switch in a similar manner in which latter event the system includes provision for sending a suitable signal from the subscriber's instrument to the central exchange to inform the exchange that the line has been placed on a hold basis and to close the switch.

Alternatively the program material can be distributed over a separate line or a phantom circuit from the central exchange to the subscriber's location and automatically applied to a held line by closing a switch at the subscriber's premises. This latter arrangement is not practical except for a large local installation.

It also may be mentioned that although direct connection of the program line into the holding circuit of the subscriber's telephone installation (and, therefore to the incoming line which is thus held) is a relatively simple and effective arrangement, the program signal can be introduced into the holding circuit and thereby coupled to the incoming line as a modulation of a high frequency carrier wave, this being particularly useful when the program material is coupled to the holding circuit electromagnetically or electrostatically. Incidentally, it will be appreciated that such inductive or capacitive coupling has the very considerable advantage of not requiring any metallic connection to or modification of or intrusion into the standard telephone circuits and equipment.

It will be appreciated that there are throughout the United States a great variety of different standard telephone circuits using various types of holding instrumentalities, circuits, and components and it is, therefore, not practical to furnish diagrams for connection of a program line into all or even an appreciable variety of such circuits upon actuation of the holding instrumentality. Accordingly I have shown herein only a few simple standard telephone circuits with a simple yet effective means for connecting a program line to an incoming line (a subscriber's line) when said incoming line is connected to a holding circuit.

Referring now to FIG. 1, the circuit therein illustrated is, with the exception of the modification pursuant to my invention which I will later describe, a standard holding circuit used by the New York Telephone Company in their I A KTU type equipment. This circuit is connected to an incoming line (a subscriber's line) having terminals T, R at the subscriber's local telephone instrument. The circuit also has terminals $L_1$, $L_2$ which are connected to the hand set and dial circuit. The instrument is provided with a hold key and a pick-up (talk) key and includes a line relay LR and a hold relay HR.

The line relay LR has an actuating coil $LR_c$ which controls an arm $LR_3$ movable between a pair of stationary contacts $LR_1$ and $LR_2$. The arm $LR_3$ is biased into engagement with the contact $LR_2$ and when the coil $LR_c$ is not energized, is spaced from the contact $LR_1$.

The hold relay HR has a make coil $HR_m$, a hold coil $HR_h$ and an auxiliary winding $HR_a$ all on a common core. The hold relay HR controls an arm $HR_3$ movable between a pair of stationary contacts $HR_1$ and $HR_2$. The arm $HR_3$ is biased into engagement with the contact $HR_2$ and when the relay HR is idle is spaced from the contact $HR_1$.

The hold key includes a movable spring contact *g*, a movable spring contact *d*, and a stationary contact *e*. The contact *e* normally is engaged by the contact *d*. The contact *g* normally is spaced from the contact *d*. When the hold key is manually actuated the contact *g* first will move to engage the contact *d* while the contact *e* also is engaged by the contact *d*. Thereafter the engagement between the contacts *e* and *d* will be broken while the engagement between the contacts *g* and *d* is maintained. Releasing the hold key contacts first will reengage the contacts *d* and *e* and then subsequently will disengage the contacts *g* and *d*.

The pick-up key has a pair of movable spring contacts *a* and *b* which are shown in idle position in FIG. 1 and which are forced apart upon actuation of the pick-up, i.e. talk, key. The movable contact *a* in idle condition of the pick-up key engages a stationary contact *x*. The movable contact *b* in idle condition of the pick-up key engages a stationary contact *y*. The movable contact *a* in idle condition of the pick-up key is spaced from a stationary contact *f* but will engage said contact *f* when the pick-up key is actuated. The movable contact *b* in idle condition of the pick-up key is spaced from a stationary contact *c* but will engage said contact *c* when the pick-up key is actuated. The pick-up key includes another movable contact *h* which is mechanically tied, as by an insulating bar, to the movable spring contact *b* so as to move therewith. The movable contact *h* is shiftable between a pair of stationary contacts *z* and *i*. Said contact *h* engages the contact *z* when the pick-up key is in idle condition and engages the contact *i* when the pick-up key is actuated.

The normal operation of the FIG. 1 circuit, that is to say, the operation exclusive of the modification effected in accordance with my invention and which has not as yet been described, is as follows: an incoming call, through circuitry which is not shown and which is conventional, actuates a bell or other signal, e.g. a light, to give notice thereof. Upon such notice of this call the pick-up key is pressed, i.e. actuated, to spread apart the movable spring contacts *a* and *b*. The direct current potential appearing at the terminals T, R of the incoming line is connected to the hand set and dial circuit of the telephone instrument through the actuating coil $LR_c$ of the line relay LR. The connection runs from the terminal R, through a lead line 10, the line relay coil $LR_c$, a lead line 12, the stationary contact *f*, the movable contact *a* which now engages the contact *f*, a lead line 14, the stationary contact *e*, the movable contact *d* and a lead line 16 to the terminal $L_1$. The connection then runs through the hand set and dial circuit back to the terminal $L_2$. From the terminal $L_2$ the connection runs through a lead line 18, the movable contact *b*, the stationary contact *c* which now is engaged by the contact *b*, and a lead line 20 to the terminal T. This connection transfers the incoming call to the subscriber's hand set and also energizes the line relay LR so that the arm $LR_3$ moves off the contact $LR_2$ and engages the contact $LR_1$.

If the call is to be held the hold key is operated. As indicated above manipulation of the hold key closes the contacts *g*, *d* before opening the contacts *d*, *e*. As the contacts *g*, *d* are closed the direct current coming back from the hand set through the terminal $L_1$ through the contacts *a*, *f* and the coil $LR_c$ is shunted through the now closed pick-up key contacts *h*, *i*. This energizes the hold relay HR. The energization circuit for the hold relay HR runs from the incoming line terminal T through the lead line 20, the contacts *c*, *b*, the lead line 18, the terminal $L_2$, the hand set and dial circuit, the terminal $L_1$, the lead line 16, the contacts *d*, *g* which now are closed, a lead line 22, the contacts *h*, *i* which now are closed, a lead line 24, the make coil $HR_m$, a lead line 26 and a lead line 28 to the incoming line terminal R. Consequent actuation of the hold relay HR swings the arm $HR_3$ off the stationary contact $HR_2$ onto the stationary contact $HR_1$. Thus at this time both the line relay LR and the hold relay HR are actuated.

The operation of the hold key does not stop with making (engaging) of the contacts *g* and *d*. Continued motion of the hold key opens (separates) the contacts *d* and *e*. Opening of these latter contacts breaks the above described circuit for the line relay coil $LR_c$ so that direct current no longer flows through this coil and said relay LR thereupon becomes deactuated causing its arm $LR_3$ to reengage the stationary contact $LR_2$. In the standard telephone instrument the contact $LR_2$ has no connection. As soon will be seen however I utilize the said contact $LR_2$ in connection with my hold program system.

When the hold relay HR is actuated and its arm $HR_3$ engages its stationary contact $HR_1$, its holding coil $HR_h$ is energized by flow of current from the terminal T of the incoming line through the lead line 20, a lead line 30, a lead line 32, a 140 ohm resistor Q, a lead line 34, a lead line 36, a lead line 38, the coil $HR_h$, a lead line 40, the arm $HR_3$, the stationary contact $HR_1$, and the lead line 28 to the terminal R of the incoming line. Hence when the hold key thereafter is released and therefore the flow of current through the coil $HR_m$ is cut off by opening the contacts *d, g,* the relay HR will remain actuated and at the same time the incoming line will be bridged by the coil $HR_h$ of the hold relay HR in series with the 140 ohms resistor Q, the arm $HR_3$ and the contact $HR_1$. This causes enough current to flow through the incoming line to operate the central office relays and to keep said incoming line alive. The foregoing is the hold condition of a standard holding circuit.

As is well known, a mechanical linkage interconnects the hold key and the pick-up key in such a fashion that upon release of the hold key permitting the same to be restored to its idle condition the pick-up key will be released restoring it to idle condition thereby disconnecting the hand set circuit from the held incoming line and permitting it to be connected to some other incoming call if desired. At this stage the incoming line is therefore held alive by the actuated hold relay HR and is terminated only by the 140 ohm resistor Q in series with the hold coil $HR_h$ of the hold relay, the arm $HR_3$ and the back contact $HR_1$.

In accordance with the present invention program material is applied to the incoming (subscriber's) line which is being held. The program material is supplied from the program line to the program terminals J, K. As indicated earlier any suitable type of program material can be used. For example, the program material supplied to the terminals J, K may constitute the output from a phonograph or from a wire or tape recorder or from a radio or from a commercial entertainment line. Merely by way of example I may mention that one suitable source of program material is the output from an endless loop tape player, such for instance as the Viking model "36" or the Viking model "35," both manufactured by Viking of Minneapolis, Inc., Minneapolis, Minn. Such tape players include a rather long endless loop of magnetic tape that provides hours of play.

In the form of my invention now being described the program material is applied from a suitable source to the program line as an electric audio signal, that is to say an electric signal modulated at audio frequency and without a carrier wave. Said program line terminals J, K are connected by lead lines 42, 44 to the input winding of an impedance matching transformer T*r* having an output winding. The windings and the core of the transformer are designed to match the impedance of the program line to that of the 140 ohm resistor Q and the incoming line in series with the coil $HR_h$ of the holding relay HR. Said transformer also serves to isolate the program line from the telephone circuit and avoids any metallic connection between them, although it is within the scope of my invention to provide such metallic connection if desired.

It is pointed out that the program line is connected to the incoming line upon closure of the switch constituted by the arm $LR_3$ and the contact $LR_2$ which are closed because operation of the hold key first shunted and then opened the actuating coil for the line relay LR. Specifically audio modulated current runs from one terminal of the output winding of the transformer T*r* through a lead line 46, a condenser C, a lead line 48, the lead line 32, the 140 ohm resistor Q, the lead line 34, the arm $LR_3$, the contact $LR_2$, which engages the contacts $LR_3$ since the line relay LR now is idle, and a lead line 50 back to the other terminal of the output winding of the transformer T*r*. The condenser C which is series connected between the transformer output winding and the incoming line terminal T prevents short circuiting the direct current of the incoming line through the said output winding. However said condenser presents only a negligible impedance to the audio signal generated at said output winding. Thereby an audio program voltage signal is impressed across the 140 ohm resistor Q. This program signal therefore will appear across the incoming line terminals T, R and will be heard by the incoming caller. Such program signal is connected to the incoming line through the transformer T*r*, the normally closed line relay contacts $LR_3$, $LR_2$ (here acting as a switch) and the resistor Q. It also is applied by virtue of the arm $HR_3$ engaging the contact $HR_1$, of the hold relay whereby so long as the line relay LR is idle and the hold relay HR is actuated the program material can be heard by the incoming caller. Thus the arm $HR_3$ and contact $HR_1$ also constitute a switch connecting the program line to the incoming line, this switch also serving to connect the incoming line to the holding circuit.

When the local circuit is clear and is ready for connection to the incoming line which has been held in the manner above described and which is being supplied with program materal, its pick-up (talk) key is depressed. This may be the same key as that shown in FIG. 1 or it may be the key of another local extension line connected through contacts *x, y* and *z* of the pick-up key shown in FIG. 1. For the purpose of this description it will be assumed that the pick-up key shown in FIG. 1 is operated to connect the hand set and dial circuit terminals $L_1$ and $L_2$ to the terminals T, R of the incoming line which has been held.

Operation of the pick-up key again causes the movable spring contact *a* to engage stationary contact *f* and thereby complete a circuit through the line relay actuating coil $LR_c$ to the hand set and dial circuit. Thereupon the line relay LR is actuated to pick up the arm $LR_3$, thereby disengaging it from the stationary contact $LR_2$ and engaging the stationary contact $LR_1$. Opening of a connection between the arm $LR_3$ and the contact $LR_2$ disconnects the output winding of the transformer T*r* from across the resistor Q removing the program signal from the incoming line, i.e. opening the switch which connected the program line to the incoming line. At the same time closure of arm $LR_3$ against the stationary contact $LR_1$ short circuits the holding coil $HR_h$ of the holding relay HR thus deenergizing this relay. Thereupon the arm $HR_3$ of the holding relay falls back on the stationary contact $HR_2$ so that the bridging, i.e. holding, circuit through the resistor Q and the coil $HR_h$ of the holding relay HR is no longer connected across the incoming line terminals T, R. Thus there also is opened a second switch in the connection between the program line and the incoming line. These terminals T, R, are however, connected in the normal manner for telephone conversation by their connection through the pick-up key and the contacts *d, e* of the holding key to the hand set via the terminals $L_1$ and $L_2$. When the hand set is replaced upon its cradle at the termination of a call, the cradle switches automatically open the hand set circuit. Thereupon direct current ceases to flow from the incoming line through the hand set circuit and the actuating coil of the line relay LR. Consequently the line relay is released and the arm $LR_3$ recloses against the contact $LR_2$. This reconnects the program transformer T*r* to the shunting resistor Q, but since the switch connection between the arm $HR_3$ and the contact $HR_1$ of the holding relay is open at this time, the signal from the program line is not applied across the incoming line.

It therefore will be appreciated that in the FIG. 1 embodiment of my invention just described, the incoming call will be passed to the hand set by the operation of the pick-up key and then can be held by operation of the hold key. Operation of the hold key automatically will connect the program line to the incoming line being held until a pick-up or talk key is again operated this operation disconnecting the program line from the held incoming line and connecting said incoming line to a selected hand set.

By adding to the circuit of FIG. 1, if desired, one or more additional incoming lines, hand set circuits and pick-up keys or talk keys in accordance with presently used standardized telephone circuits, this embodiment of my invention can be applied to plural local extensions or plural trunk lines.

Although in the foregoing modification of the standard I A KTU type holding circuit the program line is not directly connected, i.e. connected through metallic leads, to the telephone circuit, metallic connections are made to the holding circuit at the juncture of the lead lines 30, 32 and at the line relay stationary contact $LR_2$. It may not be desired to make any metallic connections at all to the holding circuit and in such event I use the modification for which the circuit is shown in FIG. 2. In this form of my invention the terminals J, K of the program line are connected by lead lines 52, 54 to an open core induction coil I. Said coil is placed in proximity to the core and coil $HR_h$ of the holding relay HR, placement being such that there is a mutual linkage of magnetic flux between the coils I and $HR_h$ as schematically indicated by the reference character *m* in FIG. 2. Signal energy thereby will be transferred from the program line to the coil $HR_h$ of the relay HR. It will be understood that this arrangement constitutes a modification of the holding circuit described in FIG. 1 in which the isolating transformer T*r*, the condenser C and the lead lines 46, 48 and 50 are omitted. The stationary contact $LR_2$ is not used. The holding circuit in such modifications includes the 140 ohm resistor Q, the coil $HR_h$ and the arm $HR_3$ and the contact $HR_1$. The switch between the program line and the incoming line constitutes the arm $HR_3$ and the contact $HR_1$ which also is the switch for activating the holding circuit.

Since the inductive transfer between the coils I and $HR_h$ has an efficiency which varies as a function of the audio frequency being transmitted it is helpful to include a compensating network to keep the transfer efficiency substantially uniform over the frequency range of the program signals to be employed. Such network may be made as complex as is required for uniform transmission in accordance with principles and practices well known in the art and by means known to skilled workers therein. A very simple network containing a capacity $C_1$ in parallel with the inductance I and a resistor R in series with the inductance I is shown in FIG. 2 for illustrative purposes. The network will, of course, also include the inductive value of the coil I.

It is desirable that the induction coil I be so oriented and disposed in relation to the coils of the telephone circuit that it induces voltage substantially only in the coil $HR_h$ and optionally also in the other coils $HR_m$ and $HR_a$ of the relay HR but not in the coils of any other relays as, for instance, the line relay LR or other coils in the telephone circuit since this may introduce an undesirable interference with regular communications.

It will be apparent that the voltage introduced into the coil $HR_h$ of the relay HR is in series with the incoming line connected to the terminals T, R, the series connection being through the 140 ohm resistor Q, the contact $HR_1$ and the arm $HR_3$ of the relay HR while the line is being held. By the operation of the circuits of FIG. 1 as previously described, the circuit of the coil $HR_h$ of the hold relay HR and the resistor Q is disconnected from the incoming line by opening of the contact $HR_1$ and the arm $HR_3$ during normal line-to-hand set operation and also between calls due to the fact that at such time the hold relay HR is deactuated.

Attention is called to the fact that the hold relay HR is provided with a third coil $HR_a$ the function of which has not been previously described. In the normal use of the telephone circuit, that is to say where the modification of the present invention is not employed to connect the program line to the incoming line when the hold button is actuated, this coil $HR_a$ may be used for balancing the incoming line to prevent cross-talk if it is found necessary to do so by inserting a suitable impedance (not shown) between the point B which constitutes one terminal of the coil $HR_a$ and the incoming line terminal R. The other terminal of the coil $HR_a$ is connected by a lead line 56 to the lead line 30 and thence to the incoming line terminal T. Program material when induced into the coil $HR_h$ of the relay HR also will be induced into the coil $HR_a$ so that if the balancing connection is used as above described, program material will be coupled into the incoming line during both holding and talking. Therefore in many cases where the balancing coil $HR_a$ is present and is connected in circuit the electromagnetic induction method shown in FIG. 2 of introducing program material to the incoming line may not be suitable.

Although only one of many types of local telephone equipment has been described in FIG. 1 together with its application in connection with the present invention as shown in FIGS. 1 and 2, it will be obvious to a person skilled in the telephone art how to apply the present invention to other types of local telephone equipment. For example in certain cases it might be desirable to introduce the program signal by means of an additional relay (switch), i.e. a supplemental relay, over and above the line and hold relays LR and HR. In FIG. 3 such a supplemental relay SR is shown as used with the telephone holding circuit of FIG. 1.

The program line which is connected to the terminals J, K is coupled by lead lines 58, 60 to the input winding of an isolation and impedance matching transformer $TR_1$. The output winding of the transformer has one terminal connected through a lead line 62, a blocking condenser $C_2$ and a lead line 64 to the incoming line terminal T. The other terminal of the output winding of the transformer $TR_1$ is connected by a lead line 66 to the movable arm $SR_1$ of the supplemental relay SR. The arm $SR_1$ is biased into engagement with a stationary contact $SR_2$ and away from a stationary contact $SR_3$. The operating coil $SR_0$ of the SR has one terminal connected by a lead line 68 to the movable arm $HR_3$ of the circuit shown in FIG. 1, the transformer T*r*, condenser C and lead lines 46, 48 and 50 being omitted. The other terminal of the coil $SR_0$ is connected by a lead line 70 to the movable arm $LR_3$ of the circuit shown in FIG. 1. The lead line 70 also is connected to the normally open stationary contact $SR_3$ of the supplemental relay SR.

It thus will be seen that the operating coil of said supplemental relay is connected across the holding coil $HR_h$ of the hold relay HR of FIG. 1 so that when that coil is energized in the holding operation of the FIG. 1 circuit a part of the current from the coil $HR_h$ will be diverted to the operating coil $SR_0$ of the supplemental relay SR causing this latter relay SR to be operated whenever the coil $HR_h$ of the hold relay HR is energized. In order to avoid diverting so much energy from the coil $HR_h$ of the relay HR that this hold relay would drop out, the relay SR is of a more sensitive type than the relay HR and has a coil the resistance of which is higher than the resistance of the coil $HR_h$. It would of course be possibleto provide a supplemental relay SR with a coil suitable for insertion in series with holding coil $HR_h$ of the coil relay HR instead of in parallel with it as in FIG. 3, as for instance in the lead line 36. However this would require the opening of a connection in the telephone circuit which generally is undesirable.

When an incoming call applies a direct current potential to the terminals T, R no program material will be applied to the incoming line because the circuit for the output winding of the transformer $TR_1$ is open since the contact $SR_2$ is not connected anywhere in the telephone circuit. However when the hold relay HR is energized it will cause the supplemental relay SR to be energized and will close the arm $SR_1$ against the stationary contact $SR_3$. This, acting as a switch, will complete a circuit placing the output winding of the transformer $TR_1$ across the 140 ohm resistor Q so as to connect the program line to the holding circuit of FIG. 1 constituting said resistor, the holding coil $HR_h$, the contacts $HR_1$ and the arm $HR_3$.

Where a manually operated private exchange such as a PBX No. 507 is employed an incoming line may be held by manually operating a key which simply shunts the incoming line through a series circuit constituting a resistance and an inductance and the hold is released by manually reopening the hold key. In FIG. 4 I have shown how my present invention is applied to such a circuit. In this figure lead lines 72, 74 connect the incoming line terminals T, R to the private exchange network. A hold key HK is connected across the lead lines 72, 74 by auxiliary lead lines 76, 78. The lead line 76 runs to a stationary contact $HK_1$ and the lead line 78 to a stationary contact $HK_2$. There are two movable spring contacts $HK_3$ and $HK_4$ which normally (in idle position of the hold key) are spaced respectively from the stationary contacts $HK_1$ and $HK_2$. When the hold key HK is operated the contact $HK_3$ engages the contact $HK_1$ and the contact $HK_4$ engages the contact $HK_2$. The holding circuit runs from the contact $HK_4$ through a lead line 80, an inductance L, a lead line 82, a varistor resistor V and a lead line 84 to the contact $HK_3$. Hence when the hold key is depressed the holding circuit will be shunted across the incoming terminals T, R and will hold this line which has not been connected to a local extension.

In essentially the same fashion that has been shown in and described with respect to FIG. 1, a program line is applied across the varistor resistor V by means of an isolation and impedance transformer and a blocking condenser to provide program material to the incoming line while it is being held. More particularly, the program line terminals J, K are connected by lead lines 86, 88 to the input winding of an isolation and impedance matching transformer $TR_2$. The output winding of this transformer has one terminal connected by a lead line 90, blocking condenser $C_3$ and lead line 92 to the lead line 84. The other terminal of the output winding of the transformer $TR_2$ is connected by a lead line 94 to the lead line 82 thereby program material continually is applied across the varistor resistor V. This program material is not heard on the incoming line so long as the hold key is idle. But immediately the hold key is depressed to place the holding circuit across the incoming line the program material will be heard by the incoming caller so that the holding key HK acts as the switch to connect the program line to the incoming line upon connection of the incoming line to the holding circuit.

If desired the circuit of FIG. 4 can be further modified by terminating the program line in a network including an induction coil such as shown in FIG. 2 and by so physically disposing such a coil that there is a mutual flux relationship (electromagnetic coupling) between it and the inductance L of the holding circuit of FIG. 4. In this fashion the program material can be applied to the held line without the necessity of making metallic connections to the telephone circuit as at the lead lines 82, 84 of FIG. 4.

It will be appreciated by skilled technicians in the telephone field that in the case of a PBX No. 507 circuit or any other type circuit using a varistor resistor or the like as a holding load the program signal may constitute a program signal present as an amplitude modulation of a high frequency carrier. Such a signal can be injected into the holding circuit by inductive coupling as shown in FIG. 2 or directly connected as shown in FIGS. 1, 3 and 4. It also may be coupled into the holding circuit by electrostatic coupling, means of such type being well known to the art. The efficiency of transfer for inductive or electrostatic coupling is considerably enhanced by using a high frequency carrier. It will be understood that by the term "high frequency carrier" I denote a carrier frequency above the range of the audio signal frequency.

When a program line having such a carrier is coupled into the holding circuit the carrier frequency will produce a voltage across the varistor resistor V of the holding circuit. A varistor resistor is, of course, a device having a non-linear value of resistance, its resistance decreasing very rapidly when the applied voltage becomes greater than a predetermined value, which in the case of the telephone line is a voltage slightly higher than the normally applied telephone line voltage. When thus biased by the normal direct current voltage of the telephone line a varistor resistor will act as a rectifier of alternating current voltages superimposed on the line. Although its efficiency as a rectifier is not high, nevertheless it will be sufficiently efficient to demodulate the applied carrier and extract therefrom its program amplitude modulated signal which then will appear across the incoming line. The inherent capacity of the line will prevent the carrier from appearing on the incoming line in a sufficient magnitude to disturb other telephone equipment or functions and the recovered program signal accordingly will appear only on the held line. As noted previously an advantage of using amplitude modulated carrier frequency injection of the program signal is that there is a greater transfer of signal energy at a carrier frequency with a smaller inductive or electrostatic coupling between the program line and the holding circuit.

In certain cases where the electrical constants of the holding circuit happened to be suitable carries which are frequency modulated rather than amplitude modulated by the program signal the frequency modulated signal also may be demodulated by the holding circuit varistors. It only is necessary that there be a considerable change in the value of the holding circuit impedance with changing frequency at the carrier frequency for demodulation of a frequency modulation signal to be effected.

It will, of course, be apparent that where it is convenient, practicable and acceptable to make direct connections into the telephone circuits from the program line such as is illustrated in FIGS. 1, 3 and 4 the added complexity of induction coil placement coupling and program circuit networks as shown in FIG. 2 and carrier modulation ordinarily would not be warranted.

In central station installations of my invention, circuits of the general nature of those shown in FIGS. 1, 3 and 4 may be used, with modifications to adapt them to the specific central station circuits which modifications are obvious to one who is skilled in the art. In order that the central station be advised as to which line is being held, so that program material may be applied to held lines only, a local code signal may be generated at the subscriber's installation and may be applied to the holding circuit in any of the ways described above or in any other convenient manner. This signal could be a constant tone at any frequency within the transmitted voice frequency range, preferably at the lower or upper end of the range signal which could be recognized at the central office as calling for the application of program material to the signalling line. The program signal could be applied manually by the central office operator, or automatically in response to the code signal.

In FIG. 5 I have shown a block diagram, or functional diagram, of the general arrangement of apparatus embodying the application of my present invention to an installation such as discussed immediately above, where program signals are supplied to held lines at the central office. This arrangement has the advantage that a single source of program material can be applied to a multiplicity of subscribers' lines at a common central exchange. This is in contrast to the circuits described above in which either the program material is generated at the subscriber's local station or in which if there is a common source of program material it must be supplied to the local station via a separate line or a phantom circuit. In FIG. 5 a subscriber's (incoming) line is indicated connecting a central exchange to a local telephone installation. If there is an incoming call on this line which the local station wishes to hold, the hold button is operated in the normal manner, placing a holding circuit 96 in operation. With this circuit operating, a code generator 98 applies a code signal to the line via the holding circuit 96. This code signal passes back to the central exchange via the subscriber's held line, and into a monitoring board 100 and the associated central exchange circuitry to a code recognition device 102 which may be the human operator or an automatic code recognition circuit. The operator or automatic recognition circuit thereupon switches the program signal produced by a program generator 104 over a program line 106 onto the held line by means of an application switch 108 which operates to provide suitable connections to the subscriber's held line through the circuits of the monitoring board 100 or elsewhere in the central office circuits according to the most convenient and practicable mode.

It thus will be seen that I have provided a device telephone hold program system which achieves the several objects of my invention and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and means operatively connecting said program line to said incoming line upon actuation of said instrumentality whereby when the holding circuit is operatively connected to the incoming line and the receiver is disconnected therefrom said incoming line but not the receiver will be supplied with program material.

2. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and switch means operatively connecting said program line to said incoming line upon actuation of said instrumentality whereby when the holding circuit is operatively connected to the incoming line and the receiver is disconnected therefrom said incoming line but not the receiver will be supplied with program material.

3. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and electromechanically actuated switch means operatively connecting said program line to said incoming line upon actuation of said instrumentality whereby when the holding circuit is operatively connected to the incoming line and the receiver is disconnected therefrom said incoming line but not the receiver will be supplied with program material.

4. A telephone hold program system for use with a telephone circuit having an incoming line, a holding circuit normaly operatively disconnected from the incoming line and a hold instrumentality which upon actuation operatively connects the holding circuit to the incoming line and disconnects a telephone receiver from the incoming line: said system comprising a program line normally operatively disconnected from the incoming line and mechanically actuated switch means operatively connecting said program line to said incoming line upon actuation of said instrumentality whereby when the holding circuit is operatively connected to the incoming line and the receiver is disconnected therefrom said incoming line but not the receiver will be supplied with program material.

5. A telephone hold program system for use with a telephone circuit having an incoming line, a holding circuit normaly operatively disconnected from the incoming line and a hold instrumentality which upon actuation operatively connects the holding circuit to the incoming line and disconnects a telephone receiver from the incoming line: said system comprising a program line normally operatively disconnected from the incoming line and electronic switch means operatively connecting said program line to said incoming line upon actuation of said instrumentality whereby when the holding circuit is operatively connected to the incoming line and the receiver is disconnected therefrom said incoming line but not the receiver will be supplied with program material.

6. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and switch means operatively connecting said program line to said holding circuit upon actuation of said instrumentality whereby when the holding circuit is operatively connected to the incoming line and the receiver is disconnected therefrom said incoming line but not the receiver will be supplied with program material.

7. A telephone hold program system for use with a telephone circuit having an incoming line from a central exchange, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and means at the central exchange operatively connecting said program line to said incoming line upon actuation of said instrumentality whereby when the holding circuit is operatively connected to the incoming line and the receiver is disconnected therefrom said incoming line but not the receiver will be supplied with program material.

8. A telephone hold program system for use with a telephone circuit having an incoming line to a local station, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and means at the local station operatively connecting said program line to said incoming line upon actuation of said instrumentality whereby when the holding circuit is operatively connected to the incoming line and the receiver is disconnected therefrom said incoming line but not the receiver will be supplied with program material.

9. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and means operatively directly connecting said program line to said incoming line upon actuation of said instrumentality whereby when the holding circuit is operatively connected to the incoming line and the receiver is disconnected therefrom said incoming line but not the receiver will be supplied with program material.

10. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and means operatively couplingly connecting said program line to said incoming line upon actuation of said instrumentality whereby when the holding circuit is operatively connected to the incoming line and the receiver is disconnected therefrom said incoming line but not the receiver will be supplied with program material.

11. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and means operatively inductively connecting said program line to said incoming line upon actuation of said instrumentality whereby when the holding circuit is operatively connected to the incoming line and the receiver is disconnected therefrom said incoming line but not the receiver will be supplied with program material.

12. A telephone hold program system for use with a telephone circuit having an incoming line, a holding circuit normally operatively disconnected from the incoming line and a hold instrumentality which upon actuation operatively connects the holding circuit to the incoming line and disconnects a telephone receiver from the incoming line: said system comprising a program line normally operatively disconnected from the incoming line and means operatively electrostatically connecting said program line to said incoming line upon actuation of said instrumentality whereby when the holding circuit is operatively connected to the incoming line and the receiver is disconnected therefrom said incoming line but not the receiver will be supplied with program material.

13. A system as set forth in claim 1 wherein the holding circuit includes a resistor and wherein the program line is connected across said resistor.

14. A system as set forth in claim 1 wherein the holding circuit includes an inductance and wherein the program line is inductively coupled to said inductance.

15. A system as set forth in claim 1 wherein the program line includes an isolation transformer.

16. A system as set forth in claim 1 wherein a normally open switch connects the program line to the holding circuit, said switch being rendered operatively conducting upon actuation of the hold instrumentality.

17. A system as set forth in claim 1 wherein the program line is connected to the holding circuit and wherein the holding instrumentality by connecting the holding circuit to the incoming line connects the program material to the incoming line.

18. A system as set forth in claim 1 wherein the telephone circuit includes a varistor and wherein the program line has a high frequency carrier modulated with program material whereby when the incoming line is supplied with program material the modulated carrier is demodulated so as to supply the program material to the incoming line.

19. A telephone hold program system for use with a telephone circuit having a central exchange and local stations, each local station including a code generator and a holding circuit rendered operable by actuation of a hold instrumentality, said central exchange including a program generator, a code recognition means, an application switch and a monitoring board, said monitoring board determining the connection from the central exchange to selected local stations, said code recognition means being connected to said monitoring board and sensing the code generated by the code generating circuit of a held selected local station and said code recognition means being operable upon sensing said code to connect the program generator through the application switch and monitoring board to the subscriber's line of the held selected station while the receiver is disconnected therefrom.

20. A telephone hold program system for use with a telephone circuit having an incoming line, said system comprising a holding circuit normally operatively disconnected from said incoming line, a hold instrumentality which upon actuation operatively connects the holding circuit to the incoming line and disconnects a telephone receiver from the incoming line, a program line normally operatively disconnected from said incoming line, and means operatively connecting said program line to said incoming line upon actuation of said instrumentality and disconnecting said program line from said incoming line upon deactuation of said instrumentality whereby when the holding circuit is operatively connected to said incoming line and the receiver is disconnected therefrom said incoming line but not the receiver will be supplied with program material and whereby said program material is cut off from the incoming line when said incoming line is disconnected from said holding circuit.

References Cited by the Examiner

UNITED STATES PATENTS

| | | | |
|---|---|---|---|
| 667,503 | 2/1901 | Clark | 179—6 |
| 2,340,160 | 1/1944 | Van Deventer | 179—6 |
| 2,810,016 | 10/1957 | Knittle | 179—99 |

FOREIGN PATENTS

| | | |
|---|---|---|
| 998,475 | 9/1951 | France. |

ROBERT H. ROSE, *Primary Examiner.*

WILLIAM C. COOPER, *Examiner.*

A. J. SANTORELLI, R. MURRAY, *Assistant Examiners.*